United States Patent
Sobel

[11] Patent Number: 6,128,964
[45] Date of Patent: Oct. 10, 2000

[54] TORQUE SENSOR WITH CIRCULARLY POLARIZED MAGNETIC RING

[75] Inventor: Jarl Sobel, Västerås, Sweden

[73] Assignee: Asea Brown Boveri AB, Vasteras, Sweden

[21] Appl. No.: 09/077,466

[22] PCT Filed: Oct. 18, 1996

[86] PCT No.: PCT/SE96/01326

§ 371 Date: May 29, 1998

§ 102(e) Date: May 29, 1998

[87] PCT Pub. No.: WO97/22866

PCT Pub. Date: Jun. 26, 1997

[30] Foreign Application Priority Data

Dec. 18, 1995 [SE] Sweden ............................. 9504516-7

[51] Int. Cl.[7] ...................................................... G01L 3/02
[52] U.S. Cl. ...................................... 73/862.335; 73/193
[58] Field of Search ..................... 73/862.193, 862.333, 73/862.335

[56] References Cited

U.S. PATENT DOCUMENTS

| | | | |
|---|---|---|---|
| 4,479,390 | 10/1984 | Meixner | 73/862.333 |
| 4,506,554 | 3/1985 | Blomkvist et al. | 73/862.335 |
| 4,616,512 | 10/1986 | Himmelstein et al. | 73/862.36 |
| 4,823,620 | 4/1989 | Edo et al. | 73/862.36 |
| 4,899,598 | 2/1990 | Gumaste et al. | 73/862.36 |
| 5,122,742 | 6/1992 | Hoffman et al. | 324/209 |
| 5,591,925 | 1/1997 | Garshelis | 73/862.335 |

FOREIGN PATENT DOCUMENTS

| | | |
|---|---|---|
| 0525551 A2 | 2/1993 | European Pat. Off. |
| 667836 | 6/1979 | U.S.S.R. |

*Primary Examiner*—Maxi Noori
*Attorney, Agent, or Firm*—Watson Cole Grindle Cole, P.L.L.C.

[57] ABSTRACT

A torque transducer comprising a shaft (1) with a circularly polarized ring (2) which, when loading the shaft with a torque, generates an axial static magnetic field in the shaft and wherein the ring is concentrically surrounded by a stationary tubular shell (3) which is freely arranged in relation to the shaft and which is provided with at least one winding (4, 8, 9) for magnetization of the shaft with a given frequency. A phase-sensitive detector (5) connected to the winding supplies a signal corresponding to the content of those voltages with even harmonics which are induced in the winding to the frequency of a controller (6). The controller generates a direct current which is proportional to the signal and is connected to the winding with such a polarity that it counteracts the static magnetic field generated in the shaft. This direct current constitutes a measure of the torque with which the shaft is loaded.

9 Claims, 1 Drawing Sheet

TORQUE SENSOR WITH CIRCULARLY POLARIZED MAGNETIC RING

TECHNICAL FIELD

The need to measure the torque which is transmitted via a shaft exists both for monitoring and control of a plurality of different processes and purposes. When the drive source of the load consists of an electric motor, normally the relevant torque can be obtained indirectly via the power supplied to the motor even though there may be a need, also in these contexts, of a more direct measurement of the torque of the drive shaft which is transmitted to the load. In other applications, for example when the drive source is an internal-combustion engine, it is required that the measurement be carried out using other methods. In the automobile industry, for example, there has been a need for several years of torque measurement both of the torque transmitted to the drive wheels via the crankshaft and of the torque transmitted to the steering device by means of the steering column.

A torque transducer according to the present invention relates to the category magnetoelastic non-contacting torque transducers.

BACKGROUND ART, THE PROBLEMS

Generally, a circular cylindrical shaft which is subjected to a torque is influenced by a pure shear stress. This stress state can be expressed, in terms of its principal stresses, as a compressive stress and a tensile stress, directed perpendicularly thereto, of the same magnitude. The principal stress directions are inclined at ±45° to a generatrix to the cylinder surface.

The most commonly used torque measurement which makes use of this is designed such that, within a measurement range of the shaft, a rotationally symmetrical, homogeneous magnetizing field, that is, an H-field, is created with the aid of a surrounding stationary excitation winding. This results in an equally homogenous magnetic flux density, that is, a B-field, in the shaft in unloaded state. When the shaft is loaded, the field configuration of the B-field is distorted, which can be detected with the aid of detection windings.

The state of the art as regards the constructive design of torque transducers based on the above method is disclosed in a number of patent specifications and technical articles. Common to most of these solutions is that two zones are created in the magnetic material, with some type of anisotropy, which causes the magnetic flux density to be deflected at an angle away from its natural direction in parallel with the generatrices to the cylinder surface of the transducer shaft.

According to the state of the art, there are a plurality of different ways of designing the magnetization and detection circuits and of achieving the above-mentioned anisotropy, some of which will be described below.

SU 667836 describes a method in which the anisotropy is created purely geometrically in each zone by cutting grooves in the surface of the shaft according to a specific pattern. This pattern consists of a number of mutually parallel lines directed at an angle of 45° to a generatrix to the cylinder surface of the transducer shaft.

U.S. Pat. No. 4,823,620 describes the same embodiment as above with respect to the geometrical anisotropy, however with the addition that the surface of the shaft is hardened or carburized for the purpose of reducing the hysteresis in the transducer.

Another magnetoelastic method for measuring the torque in a shaft is clear from EP 0 525 551 A2. The shaft whose torque is to be measured is provided with a circularly polarized magnetic ring which is shrunk or glued onto the shaft. When the shaft is loaded, also the ring will be distorted. This means that the peripheral magnetization is changed into a helical orientation with both a peripheral and an axial component.

With the aid of a Hall element which is freely mounted relative to the shaft and which is oriented such that the Hall element only senses the axial component, a measure of the torque occurring in the shaft is obtained.

Both of the above methods entail certain limitations and problems. The first-mentioned method presupposes full rotational symmetry and the shaft must be worked in order to achieve the desired anisotropy. Using a Hall element according to the second method described above also entails several disadvantages. On the one hand, a Hall element will measure the field at one point only along the circumference of the ring. When the transducer shaft rotates, and hence also the circularly polarized magnetic ring, the output signal from the Hall element will vary unless the magnetic field of the ring has a perfect symmetry. Another disadvantage is that Hall elements have very small signal levels. This makes the signal sensitive to electrical interference. In addition, Hall elements have a temperature drift which is not unessential.

SUMMARY OF THE INVENTION

The present invention is an improvement of the last described method using a circularly polarized magnetic ring which is attached to that shaft, the transducer shaft, whose torque is to be measured. The invention permits the above-mentioned disadvantages with sensing of the relevant torque with a Hall element to be eliminated.

According to the invention, the circularly polarized ring is allowed to be concentrically and freely surrounded by a tubular shell. In the unloaded state of the transducer shaft, the peripheral magnetic field from the ring will not cause any axial magnetic field in the shell. The shell is to be designed in a highly permeable and a non-linear ferromagnetic material.

The shell is to be provided with an excitation winding and supplied with a sinusoidal alternating current. The frequency of this current is to be chosen so as to allow a good measurement of the fastest torque changes which the transducer is intended to measure while at the same time it has to be chosen with respect to eddy currents so that these do not prevent the generated time-varying magnetic field from penetrating into the shell to a sufficient extent.

In the unloaded state, that is, when there is no static axial magnetic field in the shell caused by the circularly polarized ring, the time-varying H-field, because of the symmetry in the non-linear magnetization curve, will give rise to an axial time-varying B-field in the shell which only contains odd harmonics to the frequency of the supply current. When the transducer shaft is loaded with a torque, a superimposed static axial magnetic field from the circularly polarized ring is added in the shell. This results in the magnetic symmetry being broken, which leads to the occurrence also of even harmonics in the B-field.

The occurrence of these even harmonics in the B-field can be detected as a voltage induced in a detection winding wound parallel to the excitation winding or they can be detected as a voltage superimposed on the voltage driving the supply current.

The detector for detecting voltages with even harmonics is adapted to supply a signal corresponding to a measure of the content of these even harmonics. This signal is then connected to a controller which generates a direct current proportional to the content of the even harmonics. The direct current can either be superimposed on the supply current, or it can be allowed to act in a separate winding. The direct current is to be directed so as to counteract the axial static magnetic field from the circularly polarized ring so that no even harmonics are detected with the detector any more.

This means that the current which is required for eliminating the magnetomotive force from the circularly polarized ring can be used as a measure of the torque currently occurring in the transducer shaft. By using a phase-sensitive detector, information about the direction of the torque can also be obtained.

SUMMARY OF THE INVENTION, ADVANTAGES

Figure 1:
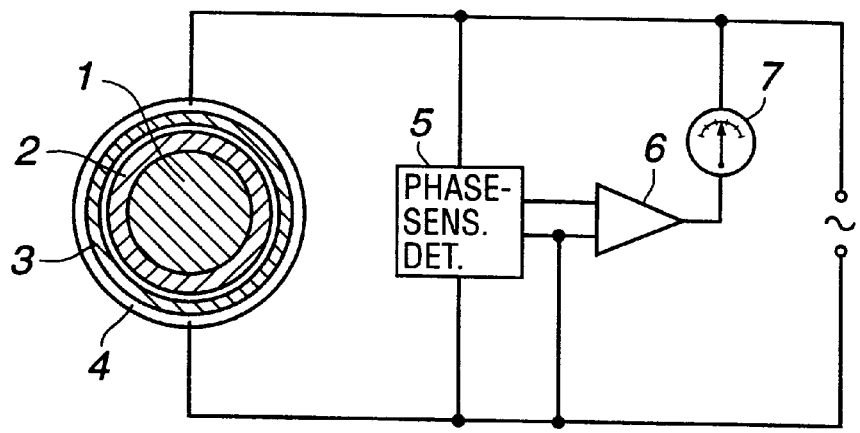
FIG. 1 shows a preferred embodiment of a torque transducer according to the invention.

As indicated under the summary of the invention, a number of more or less equivalent embodiments exist. A preferred embodiment is shown in FIG. 1.

The transducer shaft whose transmitted torque is to be determined is shown in a section at 1. The circularly polarized ring is also shown in a section at 2. Concentrically with the transducer shaft and the ring, a shell 3 is shown which, according to the above, is to be made from a highly permeable and non-linear ferromagnetic material. On this shell, a winding 4 is wound which is to be supplied with an alternating current of a suitable frequency, as described above, to magnetize the shell to generate a time-varying axial field therein. The content of those voltages with even harmonics of the supply frequency, which occur in the winding when the shaft is loaded, is measured with the aid of a phase-sensitive detector 5. The phase-sensitive detector generates a signal corresponding to the content of the detected voltages with even harmonics. This signal is connected to a controller 6 which is adapted such that it delivers a direct current which is supplied to the same winding 4 and which, with respect to direction, is such as to counteract the static axial field from the circularly polarized ring which occurs when the transducer shaft is loaded with a torque and which, with respect to magnitude, practically eliminates the static axial field. In this way, the torque in question can be read, by calibration, on a polarized instrument 7 which is traversed by the direct current.

Figure 2:
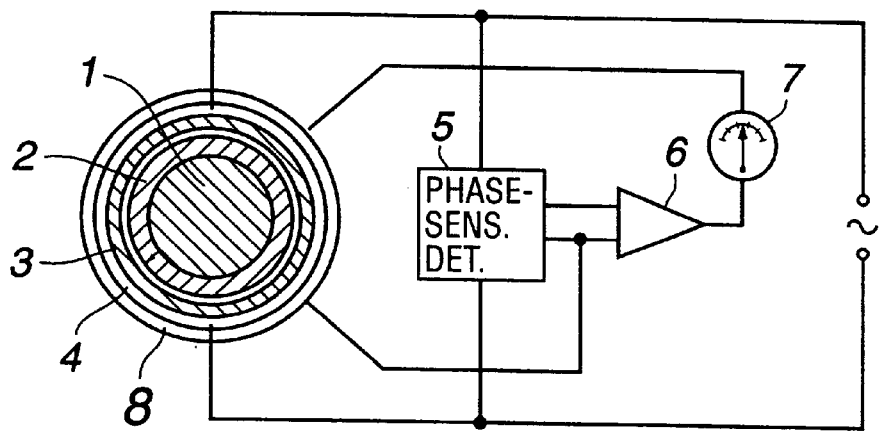
FIGS. 2 and 3 show alternative embodiments of the torque transducer.

FIG. 2 shows an alternative embodiment wherein the only difference in relation to FIG. 1 is that the generated direct current is supplied to a separate winding 8.

Figure 3:
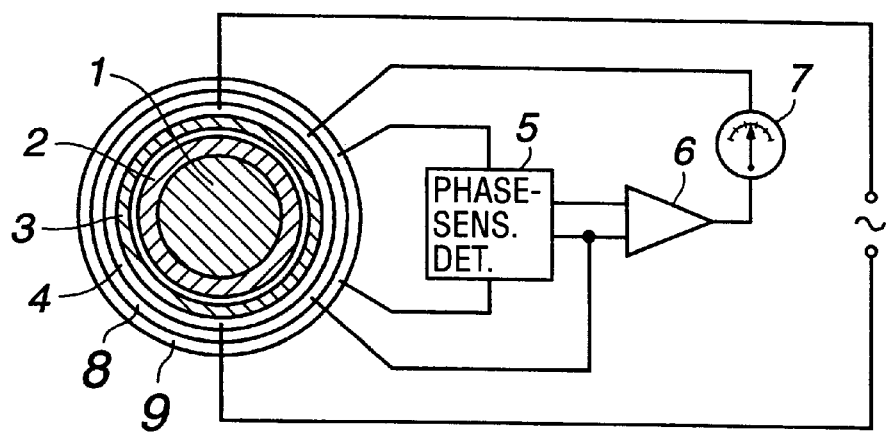

FIG. 3 shows a further embodiment wherein the even harmonics are detected by means of an individual detection winding 9 and wherein the generated direct current is supplied to the separate winding 8.

Further combinations of the embodiments described are within the scope of the invention.

I claim:

1. A torque transducer comprising a transducer shaft with a circularly polarized magnetic ring fixed to the periphery of the transducer shaft, wherein the circularly polarized magnetic ring is concentrically surrounded by a stationary tubular shell which is freely arranged in relation to the shaft and in which is generated an axial static magnetic field originating from the circularly polarized magnetic ring when the transducer shaft is loaded with a torque, and wherein the magnitude of the static magnetic field is determined by the magnitude of the torque in question, the shell is provided with at least one winding which is supplied with an alternating current of a given frequency for axial time-varying magnetization of the shell, a phase-sensitive detector for detecting and supplying a signal corresponding to the content of those voltages with even harmonics, which are induced in the winding because of the static magnetic field, of the frequency of the given magnetization current, the signal is connected to a controller for supplying a direct current proportional to the signal connected to the winding and with such a polarity that it counteracts the static axial field occurring when loading the shaft with a torque, and said direct current constitutes a measure of the torque with which the shaft is loaded.

2. A torque transducer according to claim 1, wherein the tubular shell is designed in a highly permeable and non-linear ferromagnetic material.

3. A torque transducer according to claim 1, wherein the shell is provided with a winding intended both for axial time-varying magnetization of the shell, for sensing of induced voltages with even harmonics of the frequency of the time-varying magnetization, and for achieving a field which is directed in the opposite direction of the static axial field in the shell occurring as a result of the torque load.

4. A torque transducer according to claim 1, wherein the shell is provided with a winding intended both for axial time-varying magnetization of the shell and for sensing of induced voltages with even harmonics of the frequency of the time-varying magnetization, and a winding for achieving a field which is directed in the opposite direction of the static axial field in the shell occurring as a result of the torque load.

5. A torque transducer according to claim 1, wherein the shell is provided with a winding intended for axial time-varying magnetization of the shell and a winding for sensing of induced voltages with even harmonics of the frequency of the time-varying magnetization, as well as a winding for achieving a field which is directed in the opposite direction of the static axial field in the shell occurring as a result of the torque load.

6. A torque transducer comprising:

a transducer shaft;

a circularly polarized magnetic ring surrounding the transducer shaft and secured thereto for generating an axial static magnetic field when the transducer shaft is loaded with an applied torque, said static magnetic field having a magnitude determined by the magnitude of the applied torque;

a stationary tubular shell surrounding the ring arranged in spaced relation with respect to the shaft;

at least one winding to be supplied with an alternating supply current of a selected frequency for producing an axial time-varying magnetization in the shell resulting in an induced voltage in the shell having even harmonics as a result of the static magnetic field when the shaft is loaded;

a phase-sensitive detector connected to the winding for detecting the even harmonics of the induced voltage in the shell and supplying a signal corresponding thereto;

a controller connected to the detector responsive to the signal for producing a direct current proportional to the signal having a polarity counteracting the static axial field provided by loading the shaft, said direct current being indicative of the applied torque.

7. The torque transducer according to claim 6, wherein the tubular shell comprises a highly permeable and non-linear ferromagnetic material.

8. The torque transducer according to claim 6, further including a winding for producing an axial time-varying magnetization in the shell, for sensing induced voltages with even harmonics of the frequency of the time-varying magnetization, and for producing a field which is directed in a direction opposite that of the static axial field in the shell occurring as a result of the torque load.

9. The torque transducer according to claim 6, further including a first winding for producing an axial time-varying magnetization of the shell and for sensing induced voltages with even harmonics of the frequency of the time-varying magnetization, and a second winding for producing a field which is directed in a direction opposite that of the static axial field in the shell occurring as a result of the torque load.

* * * * *